(12) United States Patent
Lehtonen

(10) Patent No.: US 10,632,880 B2
(45) Date of Patent: Apr. 28, 2020

(54) INTEGRATED CARGO AND SEAT COVER STORAGE SYSTEM

(71) Applicant: Donna Lee Elizabeth Lehtonen, King (CA)

(72) Inventor: Donna Lee Elizabeth Lehtonen, King (CA)

(*) Notice: Subject to any disclaimer, the term of this patent is extended or adjusted under 35 U.S.C. 154(b) by 0 days.

(21) Appl. No.: 16/115,285

(22) Filed: Aug. 28, 2018

(65) Prior Publication Data

US 2019/0061578 A1 Feb. 28, 2019

Related U.S. Application Data

(60) Provisional application No. 62/551,061, filed on Aug. 28, 2017.

(51) Int. Cl.
| | |
|---|---|
| *B60R 7/04* | (2006.01) |
| *A45C 13/02* | (2006.01) |
| *B60N 2/60* | (2006.01) |
| *B60N 2/58* | (2006.01) |
| *B60R 7/08* | (2006.01) |
| *B60N 2/90* | (2018.01) |

(52) U.S. Cl.
CPC ............ *B60N 2/6018* (2013.01); *B60N 2/58* (2013.01); *B60R 7/043* (2013.01); *B60N 2002/905* (2018.02); *B60R 7/08* (2013.01)

(58) Field of Classification Search
CPC .. B60N 2/6018; B60N 2/58; B60N 2002/905; B60R 7/043; B60R 7/08
USPC .......................... 297/188.01, 188.04, 188.06
See application file for complete search history.

(56) References Cited

U.S. PATENT DOCUMENTS

| | | | | |
|---|---|---|---|---|
| 1,014,004 | A * | 1/1912 | Irwin ......................... | A61J 9/06 248/102 |
| 3,540,775 | A * | 11/1970 | Defleur ..................... | A47C 7/62 297/188.2 |
| 4,862,563 | A * | 9/1989 | Flynn ...................... | A44B 18/00 24/442 |
| 4,982,885 | A * | 1/1991 | Severson ................ | A45C 13/30 224/250 |
| 5,044,538 | A * | 9/1991 | Bader ........................ | A45F 3/14 224/250 |
| 5,104,076 | A * | 4/1992 | Goodall, Jr. ............... | A45F 5/02 224/251 |
| 5,312,160 | A * | 5/1994 | Davis ...................... | A47C 7/425 297/188.01 X |
| 5,535,928 | A * | 7/1996 | Herring ..................... | A45F 5/02 224/250 |
| 5,542,590 | A * | 8/1996 | Pfitzenmaier ........... | B60R 7/043 150/102 |

(Continued)

FOREIGN PATENT DOCUMENTS

| | | | | |
|---|---|---|---|---|
| GB | 2325956 | A * | 12/1998 | ............... B60R 7/08 |
| JP | 2009214646 | A * | 9/2009 | ....... B60N 2002/905 |

*Primary Examiner* — Rodney B White
(74) *Attorney, Agent, or Firm* — Kali Law Group, P.C.

(57) ABSTRACT

Integrated cargo and seat cover storage systems are presented including: a seat cover that conforms to a vehicle seat; a cargo strap vertically coupled along an upper portion of a seat-back front surface of the seat cover, where the cargo strap includes: an elongated strap, and a number of couplers positioned along the elongated strap; and a securing coupler positioned along a lower portion of the seat-back front surface that removably secures the cargo strap with the seat-back front surface.

9 Claims, 3 Drawing Sheets

(56) References Cited

U.S. PATENT DOCUMENTS

| | | | | |
|---|---|---|---|---|
| 5,667,272 | A * | 9/1997 | Sutton | B60N 3/002 297/188.06 X |
| 5,727,842 | A * | 3/1998 | O'Neil | B60N 2/2839 297/188.06 X |
| 6,049,953 | A * | 4/2000 | McCay | A44B 18/00 24/302 |
| 6,606,768 | B2 * | 8/2003 | Henry | A45F 5/00 24/298 |
| 6,896,164 | B2 * | 5/2005 | Fialla-Dori | B60R 7/043 224/275 |
| 6,966,470 | B1 * | 11/2005 | Charlton | A45C 13/26 135/66 |
| 7,309,102 | B1 * | 12/2007 | Davis | B60N 2/6009 297/188.06 X |
| 7,766,422 | B2 * | 8/2010 | Edwards | B60R 7/005 297/188.01 |
| 9,102,276 | B1 * | 8/2015 | Virgin | B60R 7/043 |
| 9,199,580 | B2 * | 12/2015 | Lehtonen | B60R 7/043 |
| 9,463,752 | B1 * | 10/2016 | Lehtonen | B60R 7/08 |
| 9,623,806 | B2 * | 4/2017 | Rodriguez | B60R 7/043 |
| 10,017,125 | B2 * | 7/2018 | Frazier | B60R 11/02 |
| 10,081,306 | B2 * | 9/2018 | Zaccaria | B60R 7/10 |
| 10,231,384 | B2 * | 3/2019 | Edwards | A01G 5/04 |
| 2003/0121944 | A1 * | 7/2003 | Scanlan | A45C 13/30 224/409 |
| 2008/0035687 | A1 * | 2/2008 | Beaulieu | B60R 7/043 224/275 |
| 2008/0073948 | A1 * | 3/2008 | Livingston | A45C 13/30 297/188.06 X |
| 2011/0248057 | A1 * | 10/2011 | Schmitz | A45C 3/04 224/275 |
| 2013/0229045 | A1 * | 9/2013 | Agustin | B60R 7/043 297/463.1 |
| 2014/0326762 | A1 * | 11/2014 | Nolan | B60R 7/043 224/275 |
| 2015/0298619 | A1 * | 10/2015 | Parisi | B60R 11/00 224/275 |
| 2016/0355139 | A1 * | 12/2016 | Noonan | F41C 33/041 |
| 2017/0008460 | A1 * | 1/2017 | Rodriguez | B60R 7/043 |
| 2019/0217785 | A1 * | 7/2019 | Nolan | B60R 7/043 |

* cited by examiner

INTEGRATED CARGO AND SEAT COVER STORAGE SYSTEM

BACKGROUND

As long as automobiles have been driven, drivers have been placing various objects or cargo on an empty seat. At times the driver may want easy access to the cargo during travel, while at other times, the empty seat is merely a convenient temporary storage location. Most of the time, travel is uneventful and the cargo is safely transported from one location to the next. In some cases, however, events may transpire that create a hazardous situation. For example, during a hard-braking maneuver, cargo may be thrown from its resting position and interfere with the driver's ability to control the vehicle. In worst case scenarios, the driver may be injured by the cargo compounding the emergency.

While the safest method of transporting cargo in an automobile is generally to place the cargo in the trunk of the car to completely isolate the cargo from the driver. Unfortunately, in modern life, the reality is that convenience often prevails over prudence. It may be advantageous to be able to easily secure cargo that is placed in a non-driver seat.

As such, integrated cargo and seat cover storage systems are presented.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, integrated cargo and seat cover storage systems are presented including: a seat cover having a number of surfaces that conform to a vehicle seat; a cargo strap vertically coupled along an upper portion of a seat-back front surface of the seat cover, where the cargo strap includes: an elongated strap, and a number of couplers positioned along the elongated strap; and a securing coupler positioned along a lower portion of the seat-back front surface that removably secures the cargo strap with the seat-back front surface. In some embodiments, the couplers include: hook and loop tabs, buttons, snaps, clips, buckles, and magnets. In some embodiments, the elongated strap includes: a strap tape, a tubular strap, an elastic strap, a rubberized strap, a semi-elastic polymeric strap, a non-stretch polymeric strap, a natural fiber strap, and a cordage. In some embodiments, the cargo strap is extended to loop around a headrest. In some embodiments, the cargo strap is extended to loop around the vehicle seat. In some embodiments, systems further include: a pair of facing hems positioned along both sides of the cargo strap that receive the cargo strap.

In other embodiments, methods for securing cargo are presented including: providing an integrated cargo and seat cover storage system, the system including: a seat cover having a number of surfaces that conform to a vehicle seat; a cargo strap vertically coupled along an upper portion of a seat-back front surface of the seat cover, where the cargo strap includes: an elongated strap, and a number of couplers positioned along the elongated strap; and a securing coupler positioned along a lower portion of the seat-back front surface that removably secures the cargo strap with the seat-back front surface; providing a cargo; releasing the cargo strap from the securing coupler; looping the cargo strap through the cargo; and securing the cargo by coupling the cargo strap with at least one of the couplers. In some embodiments, methods further include: releasing the cargo from the cargo strap; and securing the cargo strap with the securing coupler.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Figure 1:
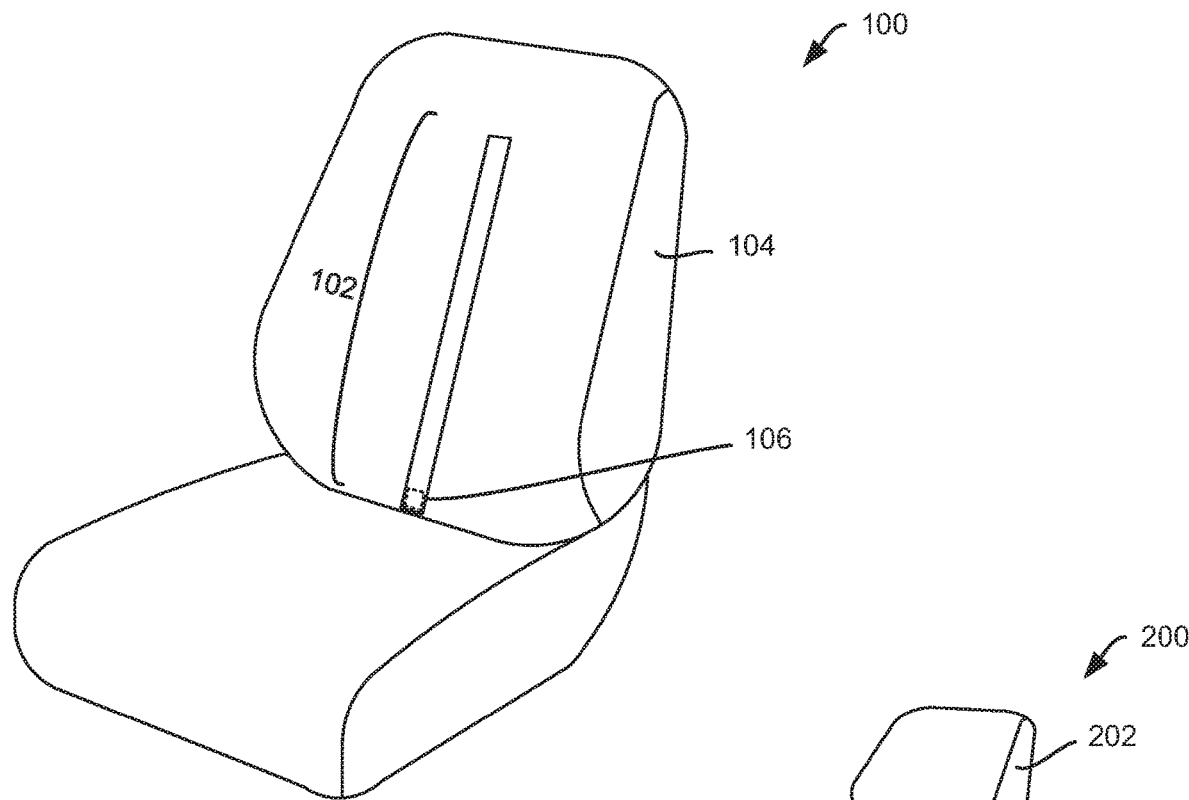
FIG. 1 is an illustrative representation of an integrated cargo and seat cover storage system in a stowed position in accordance with embodiments of the present invention.

FIG. 1 is an illustrative representation of an integrated cargo and seat cover storage system in a stowed position 100 in accordance with embodiments of the present invention. As illustrated, cargo strap 102 is vertically coupled along an upper portion of a seat-back front surface of seat cover 104. In some embodiments, a pair of facing hems may be positioned along the cargo strap to stow the strap and provide a more aesthetically pleasing appearance. Although not illustrated, one skilled in the art will readily understand the use of facing hems with embodiments disclosed herein. In embodiments, illustrated seat covers include surfaces that conform to a vehicle seat. Cargo strap embodiments may be coupled with seat cover in any manner known in the art without limitation including, for example, stitched, bonded, glued, bolted, or riveted. In the stowed position, cargo strap 102 is removably secured with the seat-back front surface by securing coupler 106 positioned along a lower portion of the seat-back front surface to prevent the cargo strap from moving about or interfering with normal use of the seat.

Figure 2:
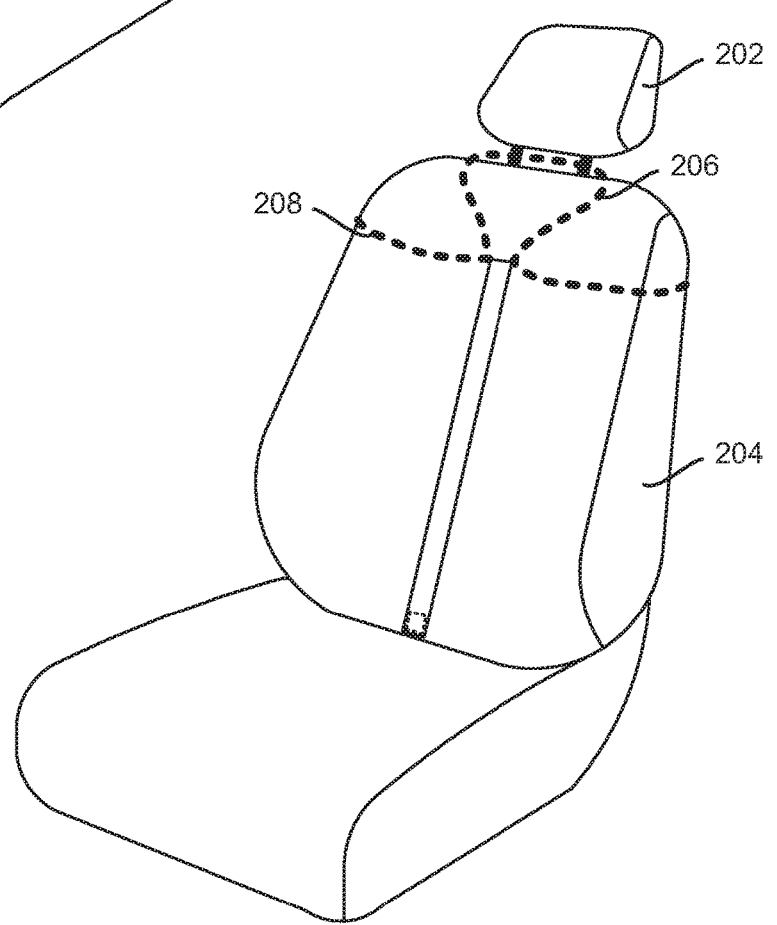
FIG. 2 is an illustrative representation of an integrated cargo and seat cover storage system in a stowed position in accordance with embodiments of the present invention.

FIG. 2 is an illustrative representation of an integrated cargo and seat cover storage system 200 in a stowed position in accordance with embodiments of the present invention. In some embodiments, cargo straps 206 may extend through seat cover 204 and loop around a structural component such as head rest 202. In other embodiments integrated cargo straps 208 may extend through seat cover 204 and loop around the vehicle seat. In this manner, embodiments provide improved cargo security especially where heavier cargo is transported. As may be appreciated, either or both of these examples may be utilized singly or in combination in embodiments. As above, a pair of facing hems may be positioned along the cargo strap to stow the strap and provide a more aesthetically pleasing appearance. Although not illustrated, one skilled in the art will readily understand the use of facing hems with embodiments disclosed herein.

Figures 3, 4:
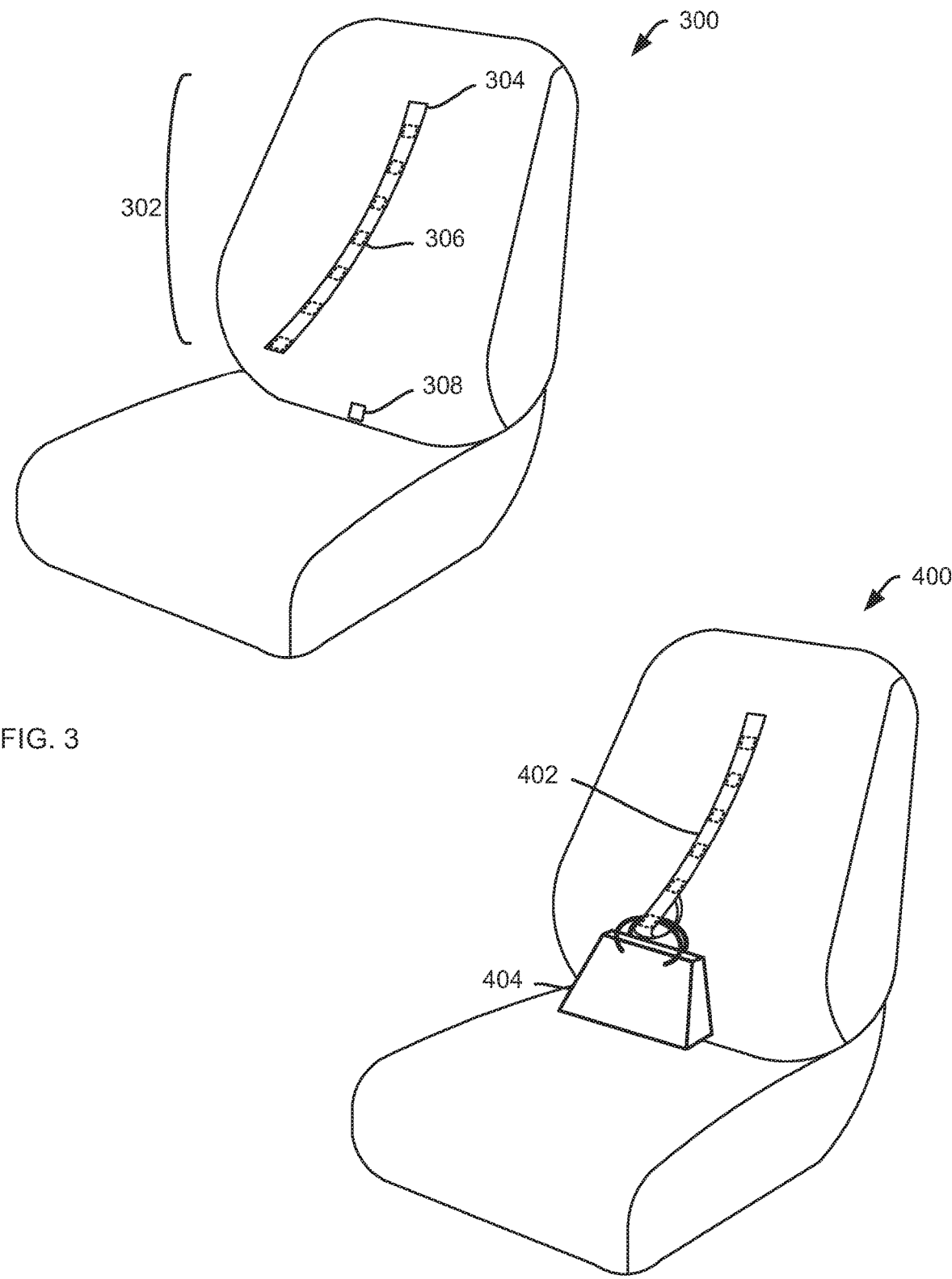
FIG. 3 is an illustrative representation of an integrated cargo and seat cover storage system in a released position in accordance with embodiments of the present invention.
FIG. 4 is an illustrative representation of an integrated cargo and seat cover storage system in use in accordance with embodiments of the present invention.

FIG. 3 is an illustrative representation of an integrated cargo and seat cover storage system 300 in a released position in accordance with embodiments of the present invention. As illustrated, cargo strap 302 includes elongated strap 304, and couplers 306 positioned along the elongated strap. In embodiments, elongated straps include, without limitation, strap tape, tubular straps, elastic straps, rubberized straps, semi-elastic polymeric straps, non-stretch polymeric straps, natural fiber straps, and a cordage. In addition, in embodiments, couplers may include any of hook and loop tabs, buttons, snaps, clips, buckles, and magnets without limitation. These tabs provide a structure that allows the cargo strap to be adjusted to accommodate various types of cargo like, for example, a purse. In some examples an animal or animal crate may be secured utilizing embodiments provided herein. Further illustrated is securing coupler 308, which as noted above, is positioned along a lower portion of the seat-back front surface to prevent the cargo strap from moving about or interfering with normal use of the seat when stowed.

FIG. 4 is an illustrative representation of an integrated cargo and seat cover storage system 400 in use in accordance with embodiments of the present invention. As illustrated, cargo strap 402 is deployed and looped through the handle of purse 404. Methods of securing cargo include:

providing an integrated cargo and seat cover storage system:

providing cargo such as, for example, a purse as illustrated;

releasing the cargo strap from the securing coupler;

looping the cargo strap through the cargo such as through a purse strap as illustrated; and securing the cargo by coupling the cargo strap with a coupler.

In removing the cargo, methods include:

releasing the cargo from the cargo strap; and securing the cargo strap with the securing coupler.

Figure 5:
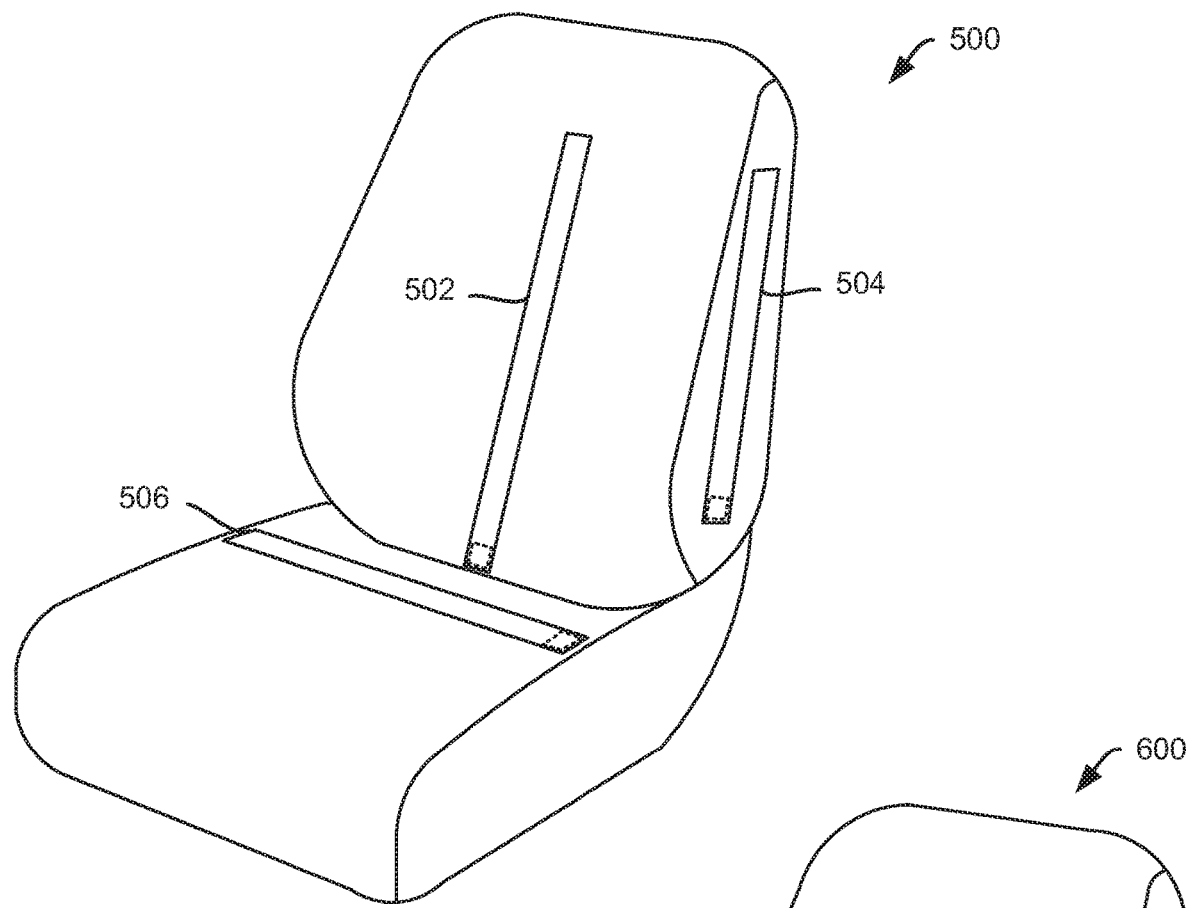
FIG. 5 is an illustrative representation of an integrated cargo and seat cover storage system with multiple integrated cargo straps in accordance with embodiments of the present invention.

FIG. 5 is an illustrative representation of an integrated cargo and seat cover storage system 500 with multiple integrated cargo straps in accordance with embodiments of the present invention. As illustrated, system 500 includes cargo strap 502 vertically coupled along an upper portion of a seat-back front surface of the seat cover and secured along a lower portion of the seat-back front surface in a stowed position as disclosed above. Further illustrated is cargo strap 504 vertically coupled along an upper portion of a seat-back edge surface and secured along a lower portion of the seat-back edge surface of the seat cover. In addition, system 500 includes cargo strap 506 coupled along a back portion of the seat-rest top surface and secured along the back portion of a seat-rest top surface of the seat cover. The illustrated embodiment is provided for clarity in understand the many ways embodiments may be configured. For example, in order to avoid interfering with side air bags, cargo straps may be integrated along a seat edge opposite the air bag. Further, cargo straps may be deployed along any other surface of the seat cover without limitation such as, for example, seat-rest sides and seat-back rear surfaces. In addition, although three cargo straps are illustrated, any of one or more of the illustrated cargo straps may be utilized in any combination or order without limitation.

Figure 6:
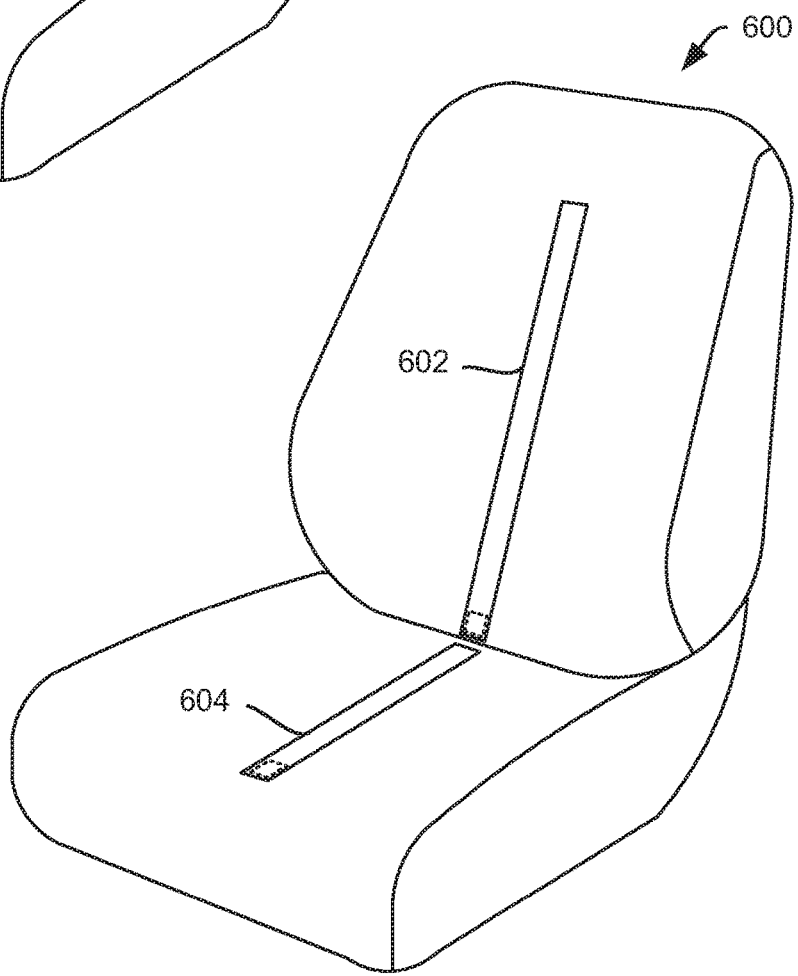
FIG. 6 is an illustrative representation of an integrated cargo and seat cover storage system with multiple integrated cargo straps in accordance with embodiments of the present invention.

FIG. 6 is an illustrative representation of an integrated cargo and seat cover storage system 600 with multiple integrated cargo straps in accordance with embodiments of the present invention. As illustrated, system 600 includes cargo strap 602 vertically coupled along an upper portion of a seat-back front surface of the seat cover and secured along a lower portion of the seat-back front surface in a stowed position as disclosed above. Further illustrated is cargo strap 604 coupled along a back central portion of a seat-rest top surface of the seat cover and secured along a front central portion of the seat-rest top surface. As above, the illustrated embodiment is provided for clarity in understand the many ways embodiments may be configured. For example, in order to avoid interfering with side air bags, cargo straps may be integrated along a seat edge opposite the air bag. Further, cargo straps may be deployed along any other surface of the seat cover without limitation such as, for example, seat-rest sides and seat-back rear surfaces. In addition, although two cargo straps are illustrated, any of one or more of the illustrated cargo straps may be utilized in any combination or order without limitation.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. An integrated cargo and seat cover storage system comprising:
   a seat cover having a plurality of surfaces that conform to a vehicle seat;
   a first cargo strap vertically coupled along an upper portion of a seat-back front surface of the seat cover, wherein the first cargo strap comprises:
      a first elongated strap, and
      a first plurality of couplers positioned along the first elongated strap; and
   a first securing coupler positioned along a lower portion of the seat-back front surface that removably secures the first cargo strap with the seat-back front surface; and
   a second cargo strap coupled along a back central portion of a seat-rest top surface of the seat cover, wherein the second cargo strap comprises:
      a second elongated strap, and
      a second plurality of couplers positioned along the second elongated strap; and
   a second securing coupler positioned along a front central portion of the seat-rest top surface that removably secures the second cargo strap with the seat-rest top surface.

2. The system of claim 1, further comprising:
   a third cargo strap vertically coupled along an upper portion of a seat-back edge surface of the seat cover, wherein the third cargo strap comprises:
      a third elongated strap, and
      a third plurality of couplers positioned along the third elongated strap; and
   a third securing coupler positioned along a lower portion of the seat-back edge surface that removably secures the third cargo strap with the seat-back edge surface.

3. The system of claim 1, further comprising:
   a third cargo strap coupled along a back portion of a seat-rest top surface of the seat cover, wherein the third cargo strap comprises:
      a third elongated strap, and
      a third plurality of couplers positioned along the third elongated strap; and
   a third securing coupler positioned along the back portion of the seat-rest top surface that removably secures the third cargo strap with the seat-rest top surface.

4. The system of claim 1, wherein the couplers are selected from the group consisting of: hook and loop tabs, buttons, snaps, clips, buckles, and magnets.

5. The system of claim 1, wherein the first elongated strap is selected from the group consisting of: a strap tape, a tubular strap, an elastic strap, a rubberized strap, a semi-elastic polymeric strap, a non-stretch polymeric strap, a natural fiber strap, and a cordage.

6. The system of claim 1, wherein the first cargo strap is extended to loop around a headrest.

7. The system of claim 1, wherein the first cargo strap is extended to loop around the vehicle seat.

8. An integrated cargo and seat cover storage system comprising:
   a seat cover having a plurality of surfaces that conform to a vehicle seat;
   a first cargo strap vertically coupled along an upper portion of a seat-back front surface of the seat cover, wherein the first cargo strap comprises:
      a first elongated strap, and
      a first plurality of couplers positioned along the first elongated strap; and
   a first securing coupler positioned along a lower portion of the seat-back front surface that removably secures the first cargo strap with the seat-back front surface; and
   a second cargo strap coupled along a back portion of a seat-rest top surface of the seat cover, wherein the second cargo strap comprises:
      a second elongated strap, and
      a second plurality of couplers positioned along the second elongated strap; and
   a second securing coupler positioned along the back portion of the seat-rest top surface that removably secures the second cargo strap with the seat-rest top surface.

9. An integrated cargo and seat cover storage system comprising:
   a seat cover having a plurality of surfaces that conform to a vehicle seat;
   a first cargo strap vertically coupled along an upper portion of a seat-back front surface of the seat cover, wherein the first cargo strap comprises:
      a first elongated strap, and
      a first plurality of couplers positioned along the first elongated strap; and
   a first securing coupler positioned along a lower portion of the seat-back front surface that removably secures the first cargo strap with the seat-back front surface; and
   a second cargo strap vertically coupled along an upper portion of a seat-back edge surface of the seat cover, wherein the second cargo strap comprises:
      a second elongated strap, and
      a second plurality of couplers positioned along the second elongated strap; and
   a second securing coupler positioned along a lower portion of the seat-back edge surface that removably secures the second cargo strap with the seat-back edge surface.

* * * * *